United States Patent
Takahashi

4,143,944
Mar. 13, 1979

[54] LARGE APERTURE WIDE-ANGLE PHOTOGRAPHIC LENS

[75] Inventor: Yasuo Takahashi, Tokyo, Japan

[73] Assignee: Asahi Kogaku Kogyo Kabushiki Kaisha, Tokyo, Japan

[21] Appl. No.: 829,109

[22] Filed: Aug. 30, 1977

[30] Foreign Application Priority Data

Sep. 2, 1976 [JP] Japan .................. 51-105169

[51] Int. Cl.² ............................ G02B 13/04
[52] U.S. Cl. ........................... 350/214
[58] Field of Search ..................... 350/214

[56] References Cited
U.S. PATENT DOCUMENTS

| | | | |
|---|---|---|---|
| 3,512,874 | 10/1967 | Wöltche | 350/214 |
| 3,992,086 | 7/1974 | Yamashita | 350/214 |
| 3,994,574 | 10/1975 | Nakagawa | 350/214 |

*Primary Examiner*—Conrad J. Clark
*Attorney, Agent, or Firm*—Sughrue, Rothwell, Mion, Zinn and Macpeak

[57] ABSTRACT

A large aperture wide-angle photographic lens system is composed of ten lenses grouped in eight lens components. In order from the object side to the image side, the first lens is a positive lens, and the second and third lenses are negative meniscus lenses having their surfaces of higher curvature facing the image side. The fourth and fifth lenses form a cemented doublet, the fourth lens being a positive lens and the fifth lens being a negative lens. The sixth and seventh lenses also form a cemented doublet with the sixth lens and the seventh lens being positive and negative lenses, respectively. Both doublets are cemented at the surfaces of highest curvature. Each of the eight, ninth and tenth lenses are positive lenses.

1 Claim, 2 Drawing Figures

LARGE APERTURE WIDE-ANGLE PHOTOGRAPHIC LENS

BACKGROUND OF THE INVENTION

Recently, a number of large aperture wide-angle photographic lenses have been developed. These lenses are remarkable because of their relatively large apertures and relatively short focal lengths making them particularly useful for available light photography. The present invention relates to such large aperture wide-angle photographic lenses, and more particularly to such a lens which is reltively small in size making it easier to use.

SUMMARY OF THE INVENTION

The large aperture wide-angle photographic lens according to the present invention is composed of ten lenses grouped in eight lens components. In order from the object side to the imge side, the first lens is a positive lens, and the second and third lenses are negative meniscus lenses having their surfaces of higher curvature facing the image side. The fourth and fifth lenses form a cemented doublet as do the sixth and seventh lenses. The fourth and sixth lenses are positive lenses while the fifth and seventh lenses are negative lenses, both doublets being cemented at the surfaces of highest curvature. Each of the eighth, ninth and tenth lenses are positive lenses. A diaphragm is inserted between the two doublets and divides the lens system into front and rear lens groups.

DETAILED DESCRIPTION OF THE INVENTION

Figure 1:
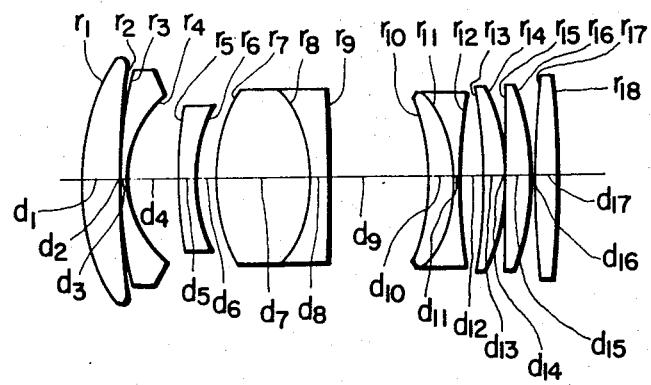
FIG. 1 is a sectional view taken along the optical axis showing the arrangement of the lens elements in the lens system according to the invention.

According to the invention, as shown in FIG. 1, there is provided a lens system comprising ten lenses grouped in eight components. The first lens $L_1$ is a positive lens, and the second and third lenses $L_2$ and $L_3$ are negative meniscus lenses whose surfaces facing toward the image side have a higher curvature. The fourth lens $L_4$ and the fifth lens $L_5$ are respectively a positive lens and a negative lens, both of which constitute a cemented doublet lens, that is, the former being adhered to the latter at the surfaces at highest curvature. The sixth lens $L_6$ and the seventh lens $L_7$ are respectively a positive lens and a negative lens and also constitute a cement doublet with the former being adhered to the latter at the surfaces of highest curvature. The eighth, ninth and tenth lenses $L_8$, $L_9$ and $L_{10}$ are positive lenses. A diaphragm (not shown) is in use inserted between the two doublets and divides the lens system into front and rear lens groups.

The wide-angle lens according to the invention is characterized by the following seven conditions as noted below:

(1) $F/1.1 < |F_{1,2,3}| < F/0.7$, $F_{1,2,3} < 0$ (2) $0.13 < (n_4 - n_5) < 0.23$ (3) $0.08F < d_6 < 0.18F$ (4) $0.75F < r_7 < 1.25F$ (5) $2F < r_{12} < 4F$ (6) $48 < \nu_8, \nu_9, \nu_{10} < 61$ $$1.2 < \frac{d_1 + \ldots + d_8}{d_9 + \ldots + d_{17}} < 1.6 \quad (7)$$

wherein

F is the focal distance of the overall lens system, $F_{1,2,\ldots i}$ is the composite focal distance of the first through the i-th lenses, $d_j$ is the j-th spacing or lens thickness, $r_k$ is the radius of curvature of the k-th surface, $n_j$ is the refractive index for d-line of the i-th lens, and $\nu_i$ is the Abbe's number of the i-th lens.

Now the features of the lens of this invention as described above will be described in detail.

Condition (1) is provided to determine the power of the negative lenses in the front lens group and obtain the desired back focal distance. When $|F_{1,2,3}|$ is shorter than F/1.1, it is easy to obtain the desired back focal distance, but this leads to a deterioration of the coma aberration caused in the fourth and sixth surfaces and a decrease in the Petzval's sum. Thus, it becomes difficult to compensate for the above described drawback in the rear lengs group. When $|F_{1,2,3}|$ is longer than F/0.7, it may be possible to obtain the desired back focal distance by increasing the value of $d_6$, $d_7$ and $d_8$, but the overall length of the lens system becomes longer. Thus, the object of miniaturaization can not be achieved because it is necessary to make the rear lens larger.

Condition (2) establishes suitable spherical and coma aberration levels in association with conditions (1) and (3). When the value of $(n_4 - n_5)$ is more than 0.23, in association with condition (4), an extreme compensation for spherical aberration becomes necessary, and coma aberration for light of comparatively high incident height is deteriorated. When the value of $(n_4 - n_5)$ is less than 0.13, the total spherical aberration becomes larger, and when compensation is made by using the extreme high degree coefficient of aberration in condition (4), undesirable scatter is liable to occur due to the effect of an error in manufacturing and therefore, it is desirable to compensate in the eighth surface by using the different refractive indices.

Condition (3) is provided to play an auxiliary role with respect to conditions (2) and (4) and simultaneously to obtain the desired back focal distance. When $d_6$ is longer than 0.18F, it is easy to obtain the desired back focal length, the result is that a high degree of compensation for spherical aberration is required and the compensation may not be sufficient and, further, the balance in the chromatic aberration is deteriorated. Moreover, miniaturization can not be achieved. In contrast, when $d_6$ is shorter than 0.08, the compensation for obtaining the desired back focal length must be made in another portion of the lens system, and this results in a decrease in the Petzval's sum.

Condition (4) determines the amount and a shape of the spherical aberration in association with condition (3). When $r_7$ is smaller than 0.75F, even if it is possible to obtain a suitable value for the amount of the spherical aberration in a zone defined by a ring in a plan perpendicular to the optical axis, the compensation for peripheral areas outside that zone becomes rapidly insufficient with the result that the balance in the focussed image is impaired. In contrast, when $r_7$ is larger than 1.25F, the compensation for the peripheral areas becomes extremely excessive, and it is difficult make this compensation in another portion of the lens system.

Condition (5) is provided to maintain a suitable coma aberration for light of comparatively low incident height. In association with the refractive index, this condition is determined so as to use a high refractive index for the negative lens $L_7$ in order that the compensation for chromatic aberration in the rear lens group may be in excess. When $r_{12}$ is shorter than 2F, the occurence of the inside coma is promoted.

Condition (6) is provided to permit the chromatic aberration in the rear lens group to be excessively compensated. In such a procedure, it is necessary to considerably lessen the compensation of the positive lenses and make $\nu_8$, $\nu_9$ and $\nu_{10}$ larger than 48 even though the sixth lens $L_6$ is cemented with the seventh lens $L_7$. In present glass materials, when the Abbe's number is larger than 61, the refractive index decreases, with the undesirable influence on the spherical aberration.

Condition (7) shows a ratio of the front and rear lens groups. When the length of the front lens group ($d_1 + \ldots + d_8$) is too great in comparison with the length of the rear lens group ($d_9 + \ldots + d_{17}$), that is, the ratio of the lengths of the front and rear lens groups is more than 1.6, since the diagram is inserted within the spacing $d_9$, the first lens must be large thus making it difficult to obtain a lens system of small size. Increasing the diameters of the lenses of the rear lens group for the purpose of increasing the light quantity passing therethrough is one of the means to make the diameters of the front lenses decrease. However, when the ratio of the lengths of the front and rear lens groups is less than 1.2, the diameters of the rear lenses become too great where the diameters of the rear lenses are limited by the inner diameter of a lens mount in practical use.

Figure 2:
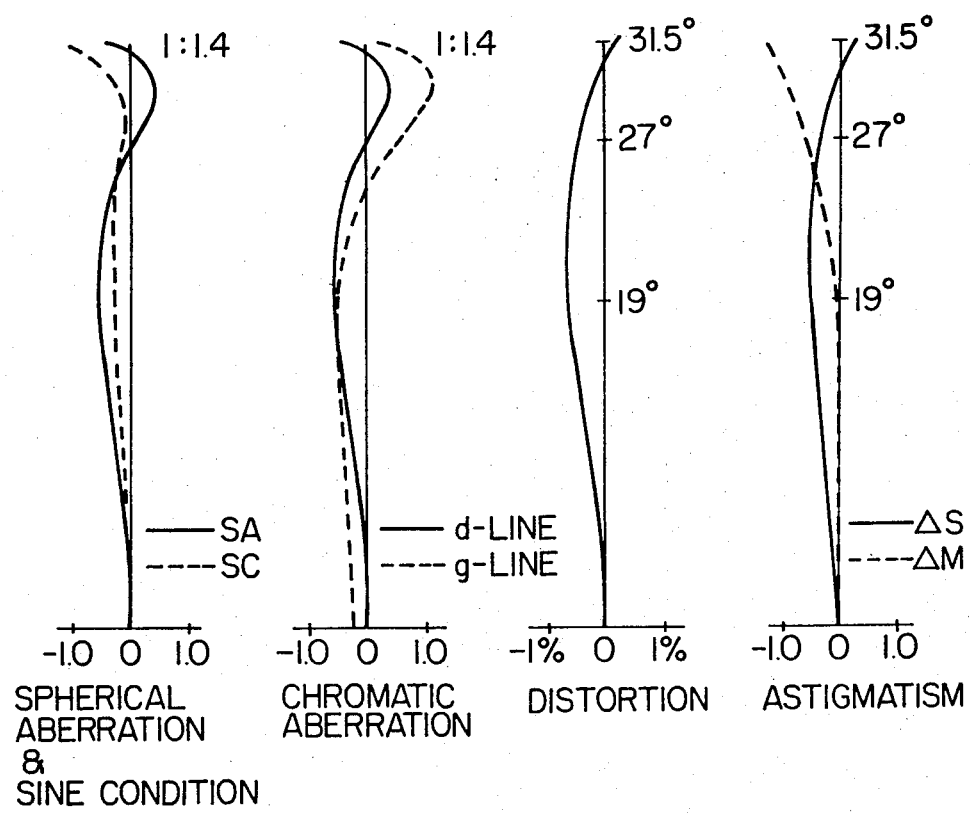
FIG. 2 is graphs showing, respectively, the spherical aberration and sine condition, the chromatic aberration, the distortion and the astigmatism of a lens system according to the invention.

Specific parameters for an example are presented below. The aberration curves resulting from this example are shown in FIG. 2.

| | | F = 100 | | | | |
|---|---|---|---|---|---|---|
| $L_1$ | $r_1 = 118.0$ $r_2 = 357.0$ | | $d_1 = 18.00$ | $n_1 = 1.74320$ | $\nu_1 = 49.4$ | |
| | | | $d_2 = 0.86$ | | | |
| $L_2$ | $r_3 = 208.2$ $r_4 = 48.1$ | | $d_3 = 3.43$ | $n_2 = 1.51633$ | $\nu_2 = 64.1$ | |
| | | | $d_4 = 25.14$ | | | |
| $L_3$ | $r_5 = 257.1$ $r_6 = 71.6$ | | $d_5 = 7.23$ | $n_3 = 1.51633$ | $\nu_3 = 64.1$ | |
| | | | $d_6 = 11.43$ | | | |
| $L_4$ | $r_7 = 102.5$ $r_8 = -61.9$ | | $d_7 = 44.05$ | $n_4 = 1.80610$ | $\nu_4 = 40.9$ | |
| $L_5$ | $r_9 = -782.2$ | | $d_8 = 8.66$ | $n_5 = 1.62588$ | $\nu_5 = 35.7$ | |
| | | | $d_9 = 19.71$ | | | |
| $L_6$ | $r_{10} = -110.2$ $r_{11} = -68.2$ | | $d_{10} = 12.43$ | $n_6 = 1.73400$ | $\nu_6 = 51.5$ | |
| $L_7$ | $r_{12} = 295.4$ | | $d_{11} = 3.43$ | $n_7 = 1.80518$ | $\nu_7 = 25.4$ | |
| | | | $d_{12} = 10.00$ | | | |
| $L_8$ | $r_{13} = -334.3$ $r_{14} = -96.0$ | | $d_{13} = 12.43$ | $n_8 = 1.73400$ | $\nu_8 = 51.5$ | |
| | | | $d_{14} = 0.29$ | | | |
| $L_9$ | $r_{15} = -714.7$ $r_{16} = -120.5$ | | $d_{15} = 11.43$ | $n_9 = 1.71300$ | $\nu_9 = 53.9$ | |
| | | | $d_{16} = 2.86$ | | | |
| $L_{10}$ | $r_{17} = 442.1$ $r_{18} = -359.7$ | | $d_{17} = 11.09$ | $n_{10} = 1.75700$ | $\nu_{10} = 47.9$ | |
| | $F_{1,2,3} = -F/0.84 = -119$ | | | | | |

What is claimed is:

1. A large aperture wide-angle photographic lens system, comprising in order from the object to the image side, a first positive lens $L_1$, second and third negative meniscus lenses $L_2$ and $L_3$ each of whose surfaces facing toward the image side has a higher curvature, a fourth positive lens $L_4$, a fifth negative lens $L_5$, said fourth and fifth lenses being adhered to each other at the surfaces of highest curvature, a sixth positive lens $L_6$ and seventh negative lens $L_7$, said sixth and seventh lenses being adhered to each other at the surfaces of highest curvature, and eighth, ninth and tenth positive lenses $L_8$, $L_9$ and $L_{10}$, said lens system satisfying the following conditions:

| | | F = 100 | | | | |
|---|---|---|---|---|---|---|
| $L_1$ | $r_1 = 118.0$ $r_2 = 357.0$ | | $d_1 = 18.00$ | $n_1 = 1.74320$ | $\nu_1 = 49.4$ | |
| | | | $d_2 = 0.86$ | | | |
| $L_2$ | $r_3 = 208.2$ $r_4 = 48.1$ | | $d_3 = 3.43$ | $n_2 = 1.51633$ | $\nu_2 = 64.1$ | |
| | | | $d_4 = 25.14$ | | | |
| $L_3$ | $r_5 = 257.1$ $r_6 = 71.6$ | | $d_5 = 7.23$ | $n_3 = 1.51633$ | $\nu_3 = 64.1$ | |
| | | | $d_6 = 11.43$ | | | |
| $L_4$ | $r_7 = 102.5$ $r_8 = -61.9$ | | $d_7 = 44.05$ | $n_4 = 1.80610$ | $\nu_4 = 40.9$ | |
| $L_5$ | $r_9 = -782.2$ | | $d_8 = 8.66$ | $n_5 = 1.62588$ | $\nu_5 = 35.7$ | |
| | | | $d_9 = 19.71$ | | | |
| $L_6$ | $r_{10} = -110.2$ $r_{11} = -68.2$ | | $d_{10} = 12.43$ | $n_6 = 1.73400$ | $\nu_6 = 51.5$ | |
| $L_7$ | $r_{12} = 295.4$ | | $d_{11} = 3.43$ | $n_7 = 1.80518$ | $\nu_7 = 25.4$ | |
| | | | $d_{12} = 10.00$ | | | |
| $L_8$ | $r_{13} = -334.3$ $r_{14} = -96.0$ | | $d_{13} = 12.43$ | $n_8 = 1.73400$ | $\nu_8 = 51.5$ | |
| | | | $d_{14} = 0.29$ | | | |
| $L_9$ | $r_{15} = -714.7$ $r_{16} = -120.5$ | | $d_{15} = 11.43$ | $n_9 = 1.71300$ | $\nu_9 = 53.9$ | |
| | | | $d_{16} = 2.86$ | | | |
| $L_{10}$ | $r_{17} = 442.1$ $r_{18} = -359.7$ | | $d_{17} = 11.09$ | $n_{10} = 1.75700$ | $\nu_{10} = 47.9$ | |
| | $F_{1,2,3} = -F/0.84 = -119$ | | | | | | where
F is the focal distance of the overall lens system,
$F_{1,2,3}$ is the composite focal distance of the first through the third lenses.
$d_j$ is the j-th spcing or lens thickness,
$r_k$ is the radius of curvature of the k-th surface,
$n_i$ is the refractive index of the d-line of the i-th lens, and
$\nu_i$ is the Abbe's number of the i-th lens.

* * * * *